L. F. LANNAY.
Brush Machine.
No. 78,102.
Patented May 19, 1868.
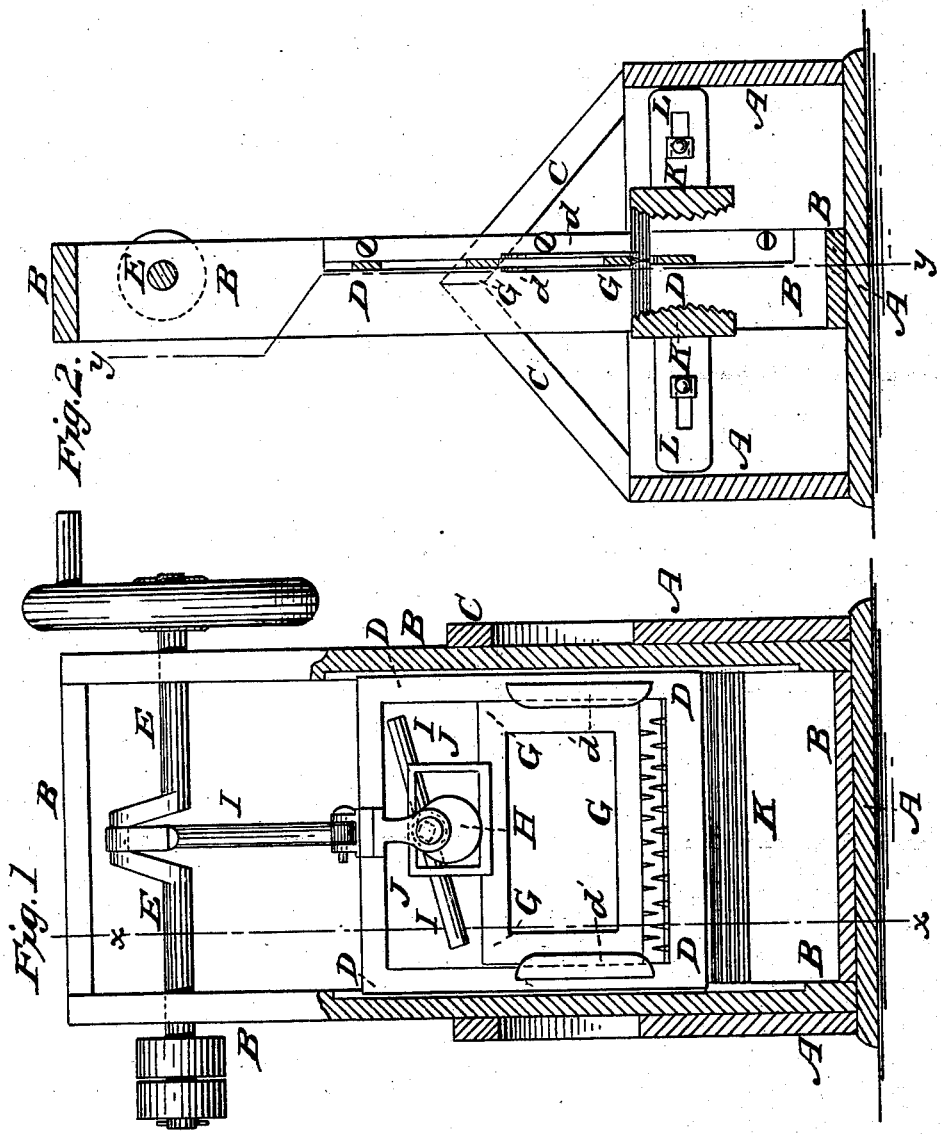
Attest:
H. C. Ashketter
Wm A Morgan
Inventor:
L. F. Lannay
per Munn
ATTYS

United States Patent Office.

LOUIS F. LANNAY, OF INDIANAPOLIS, INDIANA.

Letters Patent No. 78,102, dated May 19, 1868.

IMPROVED MACHINE FOR WASHING BRISTLES, &c.

*The Schedule referred to in these Letters Patent and making part of the same.*

TO ALL WHOM IT MAY CONCERN:

Be it known that I, LOUIS F. LANNAY, of Indianapolis, in the county of Marion, and State of Indiana, have invented a new and useful Improvement in Machines for Washing Bristles, Hair, &c.; and I do hereby declare that the following is a full, clear, and exact description thereof, which will enable others skilled in the art to make and use the same, reference being had to the accompanying drawing, forming part of this specification, in which—

Figure 1 is a side view of my improved machine, partly in section, through the line $y$ $y$, fig. 2.

Figure 2 is a vertical cross-section of the same, taken through the line $x$ $x$, fig. 1.

Similar letters of reference indicate like parts.

My invention has for its object to furnish a simple, convenient, and effective machine for washing and grinding bristles, hair, and other similar substances; and it consists in the construction and combination of the various parts, as hereinafter more fully described.

A is the box or vat, in which the washing-liquid is placed. B is a vertical frame, attached to the middle part of the sides of the tub or box A, and which may be further strengthened and supported by braces C. Upon the inner sides of the upright bars of the frame B, are formed vertical grooves or slots, in which the frame D slides up and down, as it is operated by the crank-shaft E, with which it is connected by the pitman F, and to which motion may be given by hand or any other convenient power. G is a frame, sliding up and down within the frame D, being kept in proper position upon said frame by the guides, $d'$, formed upon or attached to the side bars of the frame D, as shown in the drawings. The frame G is lowered to clamp the bristles or other material to be washed, and raised, to release the material, by a cam or eccentric-wheel H, pivoted in a stirrup, attached to the upper or top bar of the frame D. The wheel H is operated by the lever-handle I, attached to the projecting end of one of its journals, and works in a small frame, J, attached to the upper or top bar of the frame G.

Upon the lower side of the bottom bar of the frame G, and upon the upper side of the bottom bar of the frame D, are formed teeth, alternating with each, as shown in fig. 1. The said teeth are made wedge-shaped, or are broader at their bases than at their points, so that as they are forced into the material to be held they may crowd it together, so that it may be held more securely between the bottom bars of the frames G and D.

K are the rubbing-blocks, the faces of which are made convex, and are corrugated longitudinally, as shown in fig. 2. The blocks K may be made of iron, stone, or other suitable material, and are adjustably supported in place by the bars L, to the inner ends of which the said blocks K are securely attached. The bars L are secured to the sides of the box or tub A, or to other suitable supports, by bolts and nuts, which said bolts pass through the said supports, and through slots formed in the said bars L, so that the said rubbing-blocks K may be adjusted nearer to or farther from the sliding frames G and D, according to the length of the bristles or other material to be operated upon.

Having thus described my invention, I claim as new, and desire to secure by Letters Patent—

1. The combination of the vertical grooved frame B, crank-shaft E, and pitman F, with the sliding frames G and D, for the purpose of holding and operating the said frames, substantially as shown and described and for the purpose set forth.

2. The adjustable convex corrugated rubbing-blocks K, in combination with the frames G and D and cam H, substantially as herein shown and described and for the purpose set forth.

LOUIS F. LANNAY.

Witnesses:
EDW'D HUNZIKEN,
CHR. LAMPE.